(12) United States Patent
Williams et al.

(10) Patent No.: US 11,902,413 B2
(45) Date of Patent: *Feb. 13, 2024

(54) SECURE MACHINE LEARNING ANALYTICS USING HOMOMORPHIC ENCRYPTION

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/473,778

(22) Filed: Sep. 13, 2021

(65) Prior Publication Data
US 2021/0409191 A1    Dec. 30, 2021

Related U.S. Application Data

(63) Continuation of application No. 16/803,718, filed on Feb. 27, 2020, now Pat. No. 11,196,541, which is a
(Continued)

(51) Int. Cl.
*H04L 9/00*        (2022.01)
*H04L 9/32*        (2006.01)
(Continued)

(52) U.S. Cl.
CPC ............... *H04L 9/008* (2013.01); *G06N 3/08* (2013.01); *G06N 5/01* (2023.01); *G06N 20/10* (2019.01); *H04L 9/3242* (2013.01)

(58) Field of Classification Search
None
See application file for complete search history.

(56) References Cited

U.S. PATENT DOCUMENTS

| | | |
|---|---|---|
| 5,732,390 A | 3/1998 | Katayanagi et al. |
| 6,178,435 B1 | 1/2001 | Schmookler |
| | (Continued) | |

FOREIGN PATENT DOCUMENTS

| | | |
|---|---|---|
| EP | 2887607 A1 | 6/2015 |
| EP | 2873186 B1 | 3/2018 |
| | (Continued) | |

OTHER PUBLICATIONS

Vercauteren (Junfeng Van Vercauteren, "Somewhat Practical Fully Homomorphic Encryption", IACR Cryptol. ePrint Arch. 2012) (Year: 2012).*

(Continued)

Primary Examiner — Piotr Poltorak
(74) Attorney, Agent, or Firm — Carr & Ferrell LLP

(57) ABSTRACT

Provided are methods and systems for performing a secure machine learning analysis over an instance of data. An example method includes acquiring, by a client, a homomorphic encryption scheme, and at least one machine learning model data structure. The method further includes generating, using the encryption scheme, at least one homomorphically encrypted data structure, and sending the encrypted data structure to at least one server. The method includes executing a machine learning model, by the at least one server based on the encrypted data structure to obtain an encrypted result. The method further includes sending, by the server, the encrypted result to the client where the encrypted result is decrypted. The machine learning model includes neural networks and decision trees.

20 Claims, 10 Drawing Sheets

Related U.S. Application Data continuation-in-part of application No. 15/876,024, filed on Jan. 19, 2018, now Pat. No. 10,644,876.

(60) Provisional application No. 62/462,818, filed on Feb. 23, 2017, provisional application No. 62/448,890, filed on Jan. 20, 2017, provisional application No. 62/448,918, filed on Jan. 20, 2017, provisional application No. 62/448,885, filed on Jan. 20, 2017, provisional application No. 62/448,916, filed on Jan. 20, 2017, provisional application No. 62/448,899, filed on Jan. 20, 2017, provisional application No. 62/448,902, filed on Jan. 20, 2017, provisional application No. 62/448,893, filed on Jan. 20, 2017, provisional application No. 62/448,896, filed on Jan. 20, 2017, provisional application No. 62/448,908, filed on Jan. 20, 2017, provisional application No. 62/448,883, filed on Jan. 20, 2017, provisional application No. 62/448,906, filed on Jan. 20, 2017, provisional application No. 62/448,913, filed on Jan. 20, 2017.

(51) Int. Cl.
*G06N 20/10* (2019.01)
*G06N 3/08* (2023.01)
*G06N 5/01* (2023.01)

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,849,185 B1 | 12/2010 | Rockwood |
| 7,870,398 B2 | 1/2011 | Perng et al. |
| 7,937,270 B2 | 5/2011 | Smaragdis et al. |
| 8,515,058 B1 | 8/2013 | Gentry |
| 8,526,603 B2 | 9/2013 | Kerschbaum |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,716,590 B2 | 7/2017 | Gentry |
| 9,846,787 B2 | 12/2017 | Johnson et al. |
| 9,852,306 B2 | 12/2017 | Cash et al. |
| 9,942,032 B1 | 4/2018 | Komaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,120,893 B1* | 11/2018 | Rocamora ............. G06N 20/00 |
| 10,127,234 B1* | 11/2018 | Krishnan ............. G06F 16/119 |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 10,873,568 B2 | 12/2020 | Williams |
| 10,880,275 B2 | 12/2020 | Williams |
| 10,902,133 B2 | 1/2021 | Williams et al. |
| 10,903,976 B2 | 1/2021 | Williams et al. |
| 10,972,251 B2 | 4/2021 | Carr |
| 11,196,540 B2 | 12/2021 | Williams et al. |
| 11,196,541 B2 | 12/2021 | Williams et al. |
| 11,451,370 B2 | 9/2022 | Williams et al. |
| 11,477,006 B2 | 10/2022 | Williams et al. |
| 11,507,683 B2 | 11/2022 | Williams et al. |
| 11,558,358 B2 | 1/2023 | Williams |
| 11,777,729 B2 | 10/2023 | Williams et al. |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mori et al. |
| 2013/0318351 A1 | 11/2013 | Hirano |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1 | 12/2013 | Kim et al. |
| 2013/0346755 A1 | 12/2013 | Nguyen et al. |

(56) References Cited

U.S. PATENT DOCUMENTS

| | | |
|---|---|---|
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1 | 4/2016 | Soon-Shiong et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1* | 6/2016 | Rane ............... H04L 63/0428 |
| | | 713/168 |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1* | 12/2016 | Gilad-Bachrach ....... G06N 3/08 |
| 2016/0366126 A1* | 12/2016 | Sharifi ................ H04W 4/02 |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2017/0366562 A1* | 12/2017 | Zhang ............... G06N 20/00 |
| 2018/0091466 A1 | 3/2018 | Friedman et al. |
| 2018/0139054 A1 | 5/2018 | Chu et al. |
| 2018/0181802 A1* | 6/2018 | Chen ................ G06V 10/764 |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0266282 A1 | 8/2019 | Mitchell et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0019882 A1* | 1/2020 | Garg ................... G06F 21/6218 |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0382274 A1 | 12/2020 | Williams et al. |
| 2020/0396053 A1 | 12/2020 | Williams et al. |
| 2021/0034765 A1 | 2/2021 | Williams et al. |
| 2021/0105256 A1 | 4/2021 | Williams |
| 2022/0006629 A1 | 1/2022 | Williams et al. |
| 2023/0006819 A1* | 1/2023 | Spector ................... H04L 9/008 |

FOREIGN PATENT DOCUMENTS

| | | |
|---|---|---|
| JP | 5680007 B2 | 3/2015 |
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

Zhang et al., Machine Learning-Based Coding Unit Depth Decisions for Flexible Complexity Allocation in High Efficiency Video Coding, IEEE Transactions on Image Processing, vol. 24, No. 7, Jul. 2015, (Year: 2015).*

Halls-Moore Michael, "Beginner's Guide to Decision Trees for Supervised Machine Learning", found on www.quantstart.com/articles/Beginners-Guide-to-Decision-Trees-for-Supervised-Machine-Learning/, Mar. 17, 2017 (Year: 2017).*

"International Search Report" and "Written Opinion of the International Searching Authority," Patent Cooperation Treaty Application No. PCT/US2018/014535, dated Apr. 19, 2018, 9 pages.

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Information Retrieval," Jun. 8, 2016, 14 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CONC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network

(56) References Cited

OTHER PUBLICATIONS

Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "GAZELLE: A Low Latency Framework for Secure Neural Network Inference", 27th USENIX Security Symposium, Aug. 15-17, 2018. pp. 1650-1668.

Bösch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Viejo et al., "Asymmetric homomorphisms for secure aggregation in heterogeneous scenarios," Information Fusion 13, Elsevier B.V., Mar. 21, 2011, pp. 285-295.

Patil et al, "Big Data Privacy Using Fully Homomorphic Non-Deterministic Encryption," IEEE 7th International Advance Computing Conference, Jan. 5-7, 2017, 15 pages.

Panda et al., "FPGA Prototype of Low Latency BBS PRNG," IEEE International Symposium on Nanoelectronic and Information Systems, Dec. 2015, pp. 118-123, 7 pages.

Sahu et al., "Implementation of Modular Multiplication for RSA Algorithm," 2011 International Conference on Communication Systems and Network Technologies, 2011, pp. 112-114, 3 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

PIRK Code Excerpt—QuerierDriver, https://github.com/apache/incubator-retired-pirk/blob/master/src/main/java/org/apache/pirk/querier/wideskies/QuerierDriver.java; Jul. 11, 2016; 5 pages.

PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.

PIRK Code Excerpt—Query; [online]; Retreived from the Internet: <URL: https://github.com/apache/incubator-retired-pirk/blob/master/src/main/java/org/apache/pirk/query/wideskies/Query.java>; Jul. 11, 2016; 7 pages.

PIRK Code Excerpt—Queryinfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.

PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java>; Jul. 11, 2016; 8 pages.

PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.

PIRK Code Excerpt—HashSelectorsAndFormPartitionsBiginteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.

PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.

PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.

"PIRK Proposal" Apache.org [online], [retreived on Oct. 28, 2020]; Retreived from the Internet: <URL:https://cwiki.apache.org/confluence/display/incubator/PirkProposal>; Apr. 10, 2019; 5 pages.

Fan et al., "Somewhat Practical Fully Homomorphic Encryption", IACR Cryptol. ePrintArch. 2012, 19 pages.

"Microsoft Computer Dictionary", pp. 276 and 529, Microsoft Press, 5th Edition, ISBN 0735614954,2002, (Year: 2002), 4 pages.

"Homomorphic encryption", Wikipedia, May 22, 2021, pages.

* cited by examiner

Figure 7: The standard sigmoid activation function 710 vs. two polynomial approximations of it 720) that can be computed on encrypted values in a homomorphic encryption scheme.

| Feature ID | Question 905 | Instance Values |
|---|---|---|
| 1 | Has scales? | 0 |
| 2 | Warm-blooded? | 1 |
| 3 | Has four legs? | 1 |
| 4 | Has fur or hair? | 1 |
| 5 | Lays eggs on land? | 0 |
| 6 | Has wings? | 0 |

Encrypted Node Values

Node 1: $v_1 = [0,1,1,1,0,0] \cdot [E(0), E(1), E(0), E(0), E(0), E(0)] = E(1)$
Node 2: $v_2 = [0,1,1,1,0,0] \cdot [E(1), E(0), E(0), E(0), E(0), E(0)] = E(0)$
Node 3: $v_3 = [0,1,1,1,0,0] \cdot [E(0), E(0), E(0), E(0), E(0), E(1)] = E(0)$
Node 4: $v_4 = [0,1,1,1,0,0] \cdot [E(0), E(0), E(0), E(0), E(1), E(0)] = E(0)$

Encrypted Leaf Values

Leaf 1: $l_1 = 1 \times (1 - v_1) \times (1 - v_3) = 1 \times E(0) \times E(1) = E(0)$
Leaf 2: $l_2 = 2 \times (1 - v_1) \times v_2 \times (1 - v_4) = 2 \times E(0) \times E(0) \times E(1) = E(0)$
Leaf 3: $l_3 = 3 \times (1 - v_1) \times v_2 \times v_4 = 3 \times E(0) \times E(0) \times E(0) = E(0)$
Leaf 4: $l_4 = 4 \times v_1 \times (1 - v_3) = 4 \times E(1) \times E(1) = E(4)$
Leaf 5: $l_5 = 5 \times v_1 \times v_3 = 5 \times E(1) \times E(0) = E(0)$ Encrypted Prediction: $\sum_{i=1}^{5} l_i = E(0) + E(0) + E(0) + E(4) + E(0) = E(4)$

1005: Receive, by at least one server, at least one machine learning analytic data structure, the at least one machine learning analytic data structure being encrypted using a homomorphic encryption scheme.

1010: Extract by the at least one server, an instance.

1015: Evaluate, by the at least one server, the at least one analytic data structure over the instance utilizing a trained machine learning analytic to obtain at least one encrypted result.

1020: Send, by the at least one server, the at least one encrypted result to the client, wherein the client is configured to decrypt the at least one encrypted result using the homomorphic encryption scheme.

*FIG. 10*

SECURE MACHINE LEARNING ANALYTICS USING HOMOMORPHIC ENCRYPTION

CROSS-REFERENCE TO RELATED APPLICATIONS

This application is a continuation of U.S. Non-Provisional application Ser. No. 16/803,718, filed on Feb. 27, 2020, which claims the benefit and priority of U.S. Non-Provisional Application Ser. No. 15/876,024, filed on Jan. 19, 2018, which claims the benefit and priority of U.S. Provisional Application Ser. No. 62/448,890, filed on Jan. 20, 2017; U.S. Provisional Application Ser. No. 62/448,918, filed on Jan. 20, 2017; U.S. Provisional Application Ser. No. 62/448,893, filed on Jan. 20, 2017; U.S. Provisional Application Ser. No. 62/448,906, filed on Jan. 20, 2017; U.S. Provisional Application Ser. No. 62/448,908, filed on Jan. 20, 2017; U.S. Provisional Application Ser. No. 62/448,913, filed on Jan. 20, 2017; U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; U.S. Provisional Application Ser. No. 62/448,902, filed on Jan. 20, 2017; U.S. Provisional Application Ser. No. 62/448,896, filed on Jan. 20, 2017; U.S. Provisional Application Ser. No. 62/448,899, filed on Jan. 20, 2017; and U.S. Provisional Application Ser. No. 62/462,818, filed on Feb. 23, 2017; all of which are hereby incorporated by reference herein, including all references and appendices, for all purposes.

TECHNICAL FIELD

This disclosure relates to the technical field of encryption and decryption of data. More specifically, this disclosure relates to systems and methods for performing secure analytics using a homomorphic encryption including analytics for machine learning models.

Advantageously, a homomorphic encrypted analytic can execute on a server in an unsecure environment and there by obfuscate information about the analytic that could be derived by examination of the analytic. This information could include the information about computation being performed, intellectual property, proprietary information, sensitive information, or protected classes of information. Specifically, the analytics include trained machine learning models, sent in a homomorphic encrypted scheme, and executed in an unsecure environment. Thereby, the encrypted analytic can be sent to an untrusted environment, be evaluated against data under the untrusted party's control, and generate an encrypted prediction, classification or other result which can be transmitted back to a trusted environment. The decrypted result will be the same as if the unencrypted machine analytic operated on the data.

BACKGROUND

With development of computer technologies, many sensitive data, such as financial information and medical records can be kept on remote servers or cloud-based computing resources. Authorized users can access the sensitive data using applications running, for example, on their personal computing devices. Typically, personal computing devices are connected, via data networks, to servers or cloud-based computing resources. Therefore, the sensitive data can be subject to unauthorized access.

Encryption techniques, such as a homomorphic encryption, can be applied to the sensitive data to prevent unauthorized access. The encryption techniques can be used to protect "data in use", "data in rest", and "data in transit". A homomorphic encryption is a form of encryption in which a specific algebraic operation (generally referred to as addition or multiplication) performed on plaintext, is equivalent to another operation performed on ciphertext. For example, in Partially Homomorphic Encryption (PHE) schemes, multiplication in ciphertext is equal to addition of the same values in plaintext.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for secure data processing. Some embodiments of the present disclosure may facilitate a secure transmission of machine learning models from a client device to remote computing resource(s) for performing trained machine learning models over an instance(s) of data and secure transmission of results of the analysis from the computing resources back to the client device. These analytics include machine learning models including but not limited to neural network models and decision tree models where the generated results can be securely transmitted back to a client device.

According to one example embodiment of the present disclosure, a method for performing secure machine learning models using homomorphic encryption is provided. The method may include receiving, from a client, by at least one server from a client, at least one machine learning data structure. The at least one machine learning data structure can be encrypted using a homomorphic encryption scheme. The method may further include extracting, by the at least one server, an instance wherein an instance includes but is not limited to data, derived analytic results, and results of a term generator. The method may further include evaluating, by the at least one server, the at least one machine learning data structure over the instance utilizing a trained machine learning model to obtain at least one encrypted result. The method may further allow sending, by the at least one server, the at least one encrypted result to the client, wherein the client is configured to decrypt the at least one encrypted result using the homomorphic encryption scheme.

In some embodiments, the homomorphic encryption scheme includes a fully homomorphic encryption scheme. The fully homomorphic encryption scheme may include at least one of a Brakerski/Fan-Vercauteren and a Cheon-Kim-Kim-Song cryptosystem.

In some embodiments, the at least one machine learning data structure is generated based on an associated trained machine learning model. The encrypted value can be obtained using the homomorphic encryption scheme.

In certain embodiments, the machine learning model is a neural network. The at least one machine learning data structure includes neural network weights associated with the neural network.

In other embodiments, the machine learning model includes a decision tree. The at least one machine learning data structure includes a feature vector. In various embodiments, the feature vectors are binary values.

According to one example embodiment of the present disclosure, a system for performing a secure machine learning model results using homomorphic encryption is provided. The system may include at least one processor and a memory storing processor-executable codes, wherein the at least one processor can be configured to implement the operations of the above-mentioned method for performing secure analytics using homomorphic encryption.

According to yet another example embodiment of the present disclosure, the operations of the above-mentioned method for performing secure analytics using a homomorphic encryption are stored on a machine-readable medium comprising instructions, which when implemented by one or more processors perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 9 is a diagram showing details of a decision tree homomorphic encryption scheme, according to an example embodiment.

FIG. 10 is a flow chart of an example method for performing secure machine learning models using homomorphic encryption.

DETAILED DESCRIPTION OF EXEMPLARY EMBODIMENTS

Figure 1:
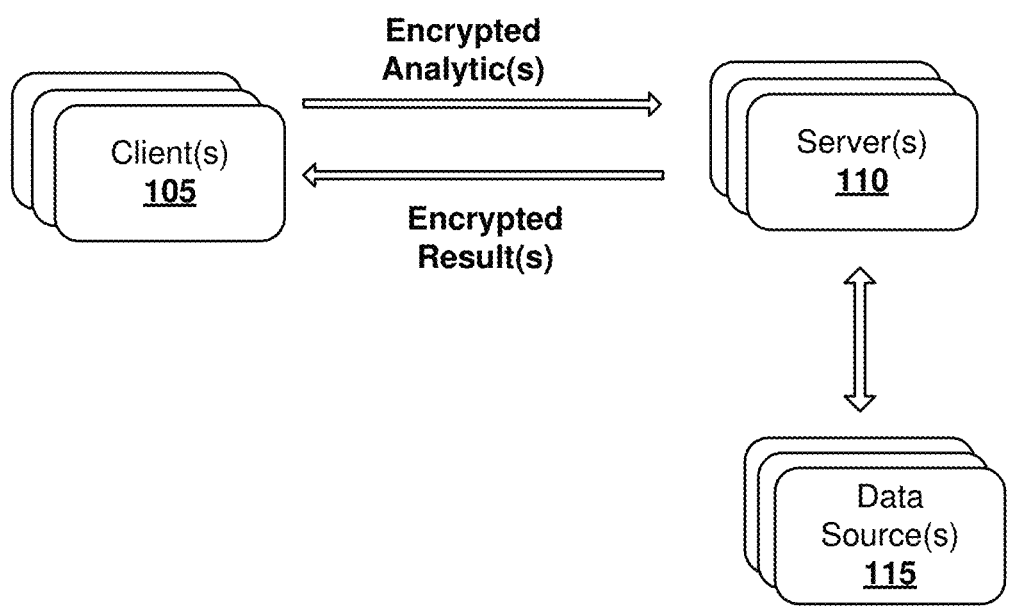
FIG. 1 is a block diagram of an example environment suitable for practicing methods for secure analytics using a homomorphic encryption as described herein.

The technology disclosed herein is concerned with methods and systems for performing secure analytics over data source using a homomorphic encryption. Embodiments of the present disclosure may facilitate a secure transmission of analytics from a client device to computing resource(s) providing a target data source and secure transmission of results of analytics from the computing resource(s) back to the client device.

Some embodiments of the present disclosure may be used to encrypt an analytic on a client device using homomorphic encryption techniques. The encrypted analytic can be sent to computing resource(s) providing desired data source(s). The encrypted analytics can be performed over desired data source(s) to produce encrypted results. The encrypted results can be returned to the client device and decrypted using the homomorphic encryption techniques. Embodiments of the present disclosure may allow performing of an analytic over desired data sources in a secure and private manner because neither content of the analytic nor results of the analytic are revealed to a data owner, observer, or attacker.

According to one example embodiment of the present disclosure, a method for performing secure analytics using a homomorphic encryption may commence with acquiring, by a client, an analytic, at least one analytic parameter associated with the analytic, and an encryption scheme. The encryption scheme may include a public key for encryption and a private key for decryption. The method may further include generating, by the client and using the encryption scheme, at least one analytical vector based on the analytic and the at least one analytic parameter. The method may further include sending, by the client, the at least one analytical vector and the encryption scheme, to at least one server.

The method may also include acquiring, by the at least one server, a data set for performing the analytic. The method may allow extracting, by the at least one server and based on the encryption scheme, a set of terms from the data set. The method may further include, evaluating, by the at least one server, the at least one analytical vector over the set of terms to obtain at least one encrypted result. The method may also include sending, by the at least one server, the at least one encrypted result to the client. The method may also include decrypting, by the client and based on the encryption scheme, the at least one encrypted result to generate at least one result of the analytic.

In other embodiments, the analytics can include ML (machine learning) models executing on a server resident or coupled instance in a non-trusted environment. An instance includes but is not limited to data, derived analytic results, and the result of a term generator. ML models are an extension to the encrypted analytics. The ML models can take different forms depending upon the particular machine learning algorithm being used. However, in all cases they contain data structures, including but not limited to vectors of weights for a neural network or a tree of features and splits for a decision tree. The data structures are used by the ML models to generate a result about a previously unseen instance of a problem. Like models, results and instances can take different forms depending on the use case. For example, an instance could be a picture and the result could be a classification of the picture as "contains a face" or "does not contain a face;" or an instance could be the historical prices for a stock over the past year and the result could be the price of that stock in three months.

Alternatively, the analytics may not be as complicated as a training machine learning model for a neural network or a decision tree. The ML analytics can include computing a histogram, an average, or executing a regression modeling calculating a result based on the data.

A ML model may be created using a training algorithm, whose input is a large number of instances called "training data." The training algorithm is run over this training data to fill in the data structure that constitutes the ML model, in such a way that the model makes good predictions, classifications, or other results over the instances in the training data. Once the ML model training is complete, the finished ML model, including the trained data structures, can be saved and used to make predictions, classifications, or other results against new instances of data encountered in the future. This saved ML model can also be executed by other parties, who can use the ML model to make predictions about instances they encounter.

Transmitting to or otherwise sharing the ML model with other parties carries risks, because it is possible to learn about the ML model by studying the data structures and data coefficients that comprise the ML model. For many ML models, a "model inversion attack" can be used to reconstruct some of the training data from the ML model. If that training data contained sensitive information, this attack can expose training data to unauthorized parties. Many ML models are also susceptible to "adversarial machine learning" techniques, which study the decision-making process represented by the ML model and look for ways to "fool" the ML model into making a bad result for some new instance. Further, many organizations consider their trained ML models to be proprietary information.

The disclosed systems and methods include techniques for using homomorphic encryption to encrypt parts of an already-trained ML (machine learning) model. Such systems and methods protects against the attacks described above by denying the attacker the ability to analyze the contents of the model as well as exposure of the model itself which may be considered proprietary. The disclosed systems and methods replaces the standard operations used during analysis with homomorphic operations, which makes it possible to use the encrypted ML model to generate encrypted results about new instances. The encrypted results can be transferred to a trusted or secure environment for decryption using a compatible homomorphic encryption model, and the ML model owner can decide whether to keep the result private or share it with the other parties. Below are two examples of how this invention can be used to homomorphically encrypt two types of machine learning models: a neural network and a decision tree.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example environment 100 suitable for practicing the methods described herein. It should be noted, however, that the environment 100 is just one example and is a simplified embodiment provided for illustrative purposes, and reasonable deviations of this embodiment are possible as will be evident for those skilled in the art.

As shown in FIG. 1, the environment 100 may include at least one client device 105 (also referred to as a client 105) and at least one server 110. The client(s) 105 can include any appropriate computing device having network functionalities allowing the device to communicate to server(s) 110. In some embodiments, the client(s) 105 can be connected to the server(s) 110 via one or more wired or wireless communications networks. In various embodiments, the client(s) 105 includes, but is not limited to, a computer (e.g., laptop computer, tablet computer, desktop computer), a server, cellular phone, smart phone, gaming console, multimedia system, smart television device, set-top box, infotainment system, in-vehicle computing device, informational kiosk, smart home computer, software application, computer operating system, modem, router, and so forth. In some embodiments, the client(s) 105 can be used by users for Internet browsing purposes.

In some embodiments, the server(s) 110 may be configured to store or provide access to at least one data source(s) 115. In certain embodiments, the server(s) 110 may include a standalone computing device. In various embodiments, the data source(s) 115 may be located on a single server(s) 110 or distributed over multiple server(s) 110. The data source(s) 115 may include plaintext data, deterministically encrypted data, semantically encrypted data, or a combination of thereof.

In some embodiments, the server(s) 110 may be implemented as cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In various embodiments, the client(s) 105 can make certain client inquires within the environment 100. For example, the client(s) 105 may be configured to send analytics to the server(s) 110 to be performed over the data source(s) 115. The server(s) 110 can be configured to perform the analytics over the data source(s) 115 and return the results of analytics to the client(s) 105.

To protect the content of the analytics, the client(s) 105 can be configured to encrypt the analytics using a homomorphic encryption scheme. The homomorphic encryption scheme can include a partially homomorphic encryption scheme and fully homomorphic encryption scheme. The partially homomorphic encryption scheme can include one of a Rivest, Shamir and Adleman cryptosystem, Elgamal cryptosystem, Benaloh cryptosystem, Goldwasser-Micali cryptosystem, and Pallier cryptosystem. The analytics can be encrypted with a public (encryption) key of the homomorphic encryption scheme. The encrypted analytics and the public key can be sent to the server 110. The encrypted analytics can be only decrypted with a private (decryption) key of the homomorphic encryption scheme. The decryption key can be kept on the client(s) 105 and never provided to the server(s) 110.

To protect the content of the results of the analytic, the server(s) 110 can be further configured to perform the encrypted analytics on the data source using the same homographic encryption scheme and the public key received from the client 105 and, thereby, obtain encrypted results of the analytics. The encrypted results can be sent to the client(s) 105. The client(s) 105 can decrypt the encrypted results using the private key. Because the private key is always kept on the client(s) 105, neither encrypted analytic nor encrypted results of the analytics can be decrypted on the server 110 or when intercepted while in transition between the client(s) 105 and the server(s) 110.

Figure 2:
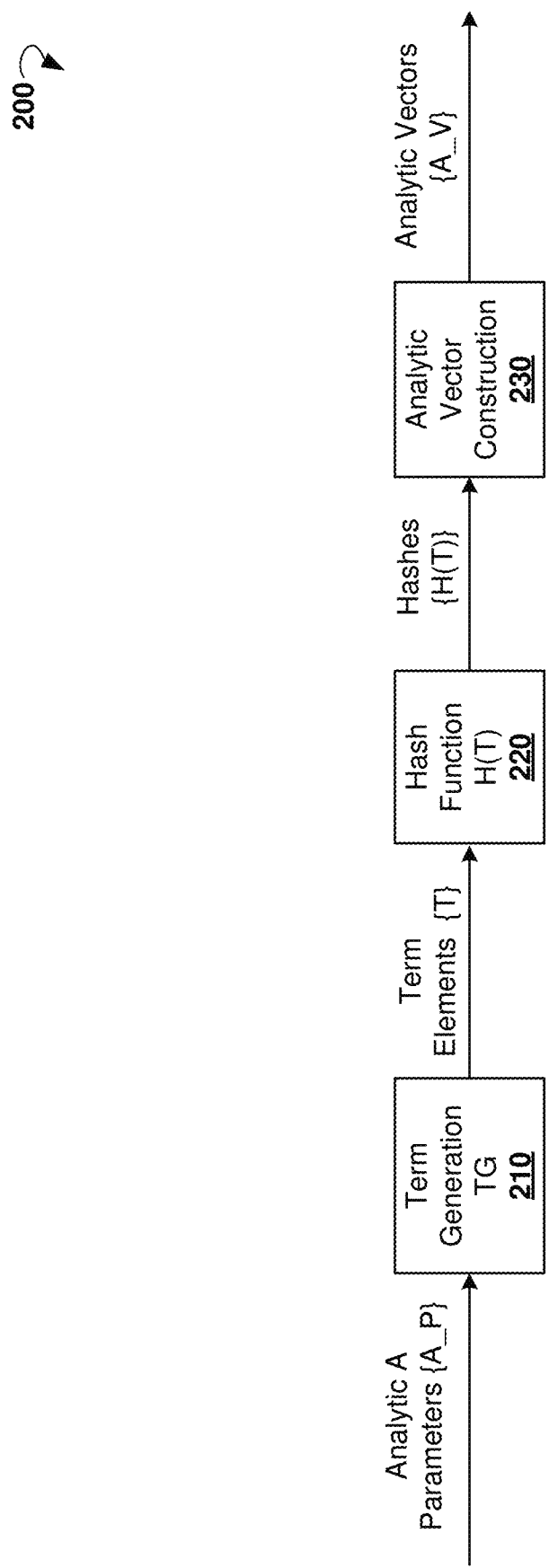
FIG. 2 is a block diagram showing details of a homomorphic encryption scheme, according to an example embodiment.

FIG. 2 is a block diagram showing details of homomorphic encryption scheme 200, according to some example embodiments. The modules of the scheme 200 can be implemented as software instructions stored in memory of the client 105 and executed by at least one processor of the client 105. The client 105 may be configured to acquire a desired analytic A to be executed over data source 115. The analytic A can be associated with analytic parameter set $\{A\_P\}$. The analytic A and analytic parameter set $\{A\_P\}$ can be further encrypted into a sequence of homomorphic analytical vectors $\{A\_V\}$ using a homomorphic encryption scheme E.

The scheme 200 may include a term generation (TG) function 210. The term generation function 210 can be used to extract a set of term elements $\{T\}$ of analytic A that correspond to an analytic parameter A_P. For example, if the analytic parameter A_P is a frequency distribution for database elements in <row:column> pairs where row=Y, then the set {T} reflects the frequency distribution of these elements from the database.

The scheme 200 may further include a keyed hash function H(T) 220. The hash function H(T) can be used to obtain a set H(T)={H(T): T in {T}}. The set H(T) is the range of the hash function H(T) over the set of term elements {T}. The keyed hash function H(T) can be associated with a public key used for the encryption. The number of distinct elements in the set H(T) is equal to the number of distinct elements in the set of term elements {T}.

The scheme 200 may further include an analytical vector construction module 230. The module 230 can be used to construct an analytical vector A_V for the analytic parameter A_P. The desired size s of the analytical vector A_V can be selected to be greater than the number of distinct elements in the set of term elements {T}. For index j=0, . . . , (s−1): if H(T)=j for a term element T in the set {T}, then vector component A_V[j]=E(B_j) where B_j is a nonzero bit mask corresponding to the term element T, wherein E is the homographic encryption scheme. If there is no T in {T} such that H(T)=j, then A_V[j]=E(0). In this manner, the analytical vector A_V includes encryptions of nonzero bitmasks for only the term elements present in the set {T}. The analytic A cannot be recovered from the analytical vectors {A_V} without a private key associated with the homomorphic encryption scheme E.

The client(s) 105 can be further configured to send the analytical vectors {A_V}, the term generation function TG, and the hash function H(T) with the public key to the server(s) 110.

In some embodiments, the server(s) 110 can be configured to extract a set of term elements {T} from the data source(s) 115 using the term generation function TG and the keyed hash function H(T). The server(s) 110 can be further configured to evaluate the encrypted analytical vectors {A_V} over the set of term elements {T} to produce encrypted results E(R). The server(s) 110 can be further configured to send the encrypted results E(R) to the client 105.

The client 105 can be configured to decrypt the encrypted results E(R) in order to obtain the results R using the private key of the homomorphic encryption scheme E. Because the analytical vector {A_V} includes nonzero entries for terms in set {T}, the homomorphic properties of E ensure that only results corresponding to the nonzero elements of the analytical vector {A_V} are present in results R.

Figure 3:
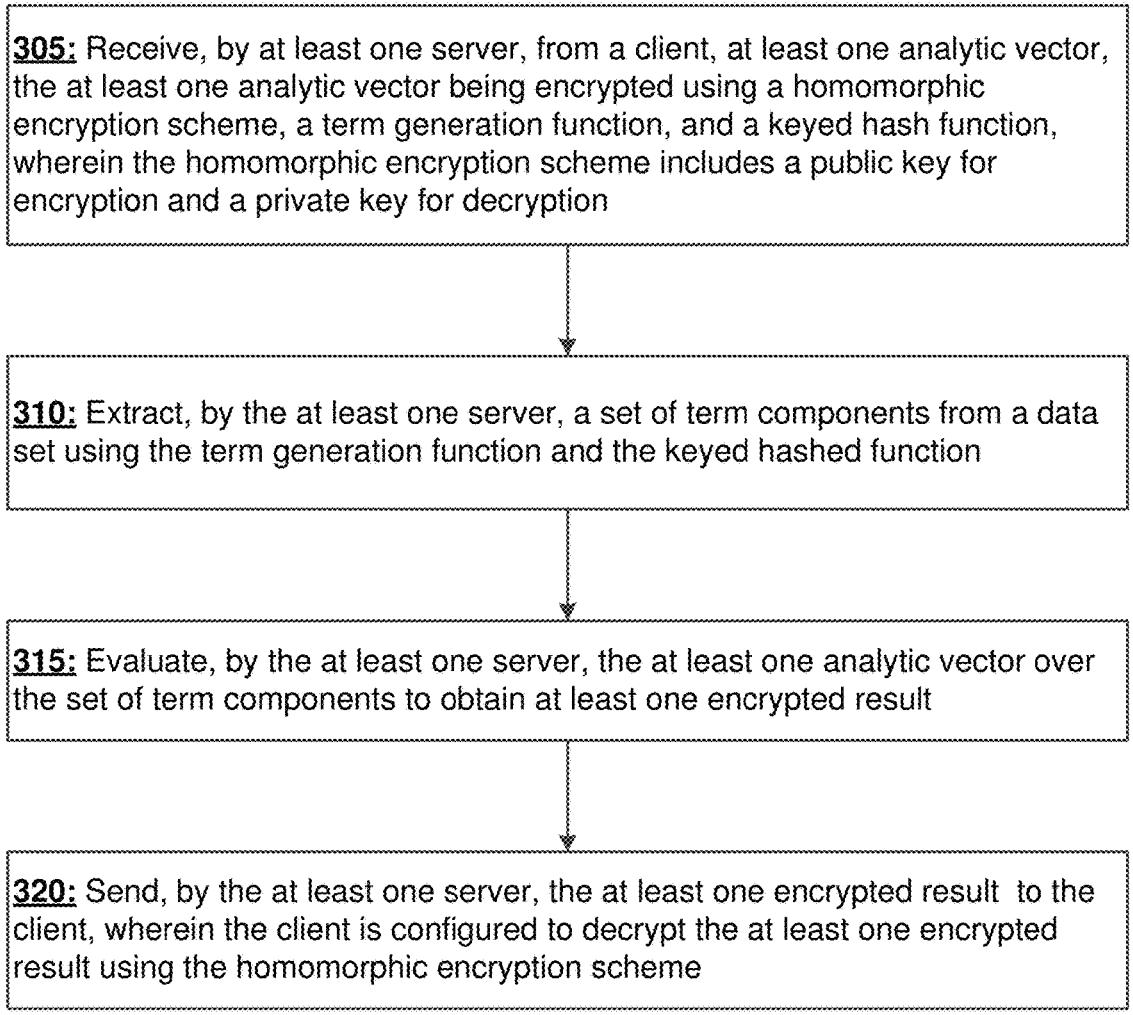
FIG. 3 is a flow chart of an example method for performing secure analytics using a homomorphic encryption.

FIG. 3 is a flow chart of an example method 300 for performing secure analytics using a homomorphic encryption, according to some example embodiments. The method 300 may be performed within environment 100 illustrated in FIG. 1. Notably, the steps recited below may be implemented in an order different than described and shown in the FIG. 3. Moreover, the method 300 may have additional steps not shown herein, but which can be evident to those skilled in the art from the present disclosure. The method 300 may also have fewer steps than outlined below and shown in FIG. 3.

The method 300 may commence in block 305 with receiving, by at least one server, from a client, at least one analytic vector, a term generation function, and a keyed hash function. The at least one analytic vector can be encrypted using the homomorphic encryption scheme. The homomorphic encryption scheme can include a public key for encryption and a private key for decryption.

In block 310, the method 300 may proceed with extracting, by the at least one server, a set of term components from a data set using the term generation function and the keyed hashed function.

In block 315, the method 300 may evaluate, by the at least one server, the at least one analytic vector over the set of term components to obtain at least one encrypted result.

In block 320, the method may proceed with sending, by the at least one server, the at least one encrypted result to the client. The client can be configured to decrypt the at least one encrypted result using the homomorphic encryption scheme.

Figure 4:
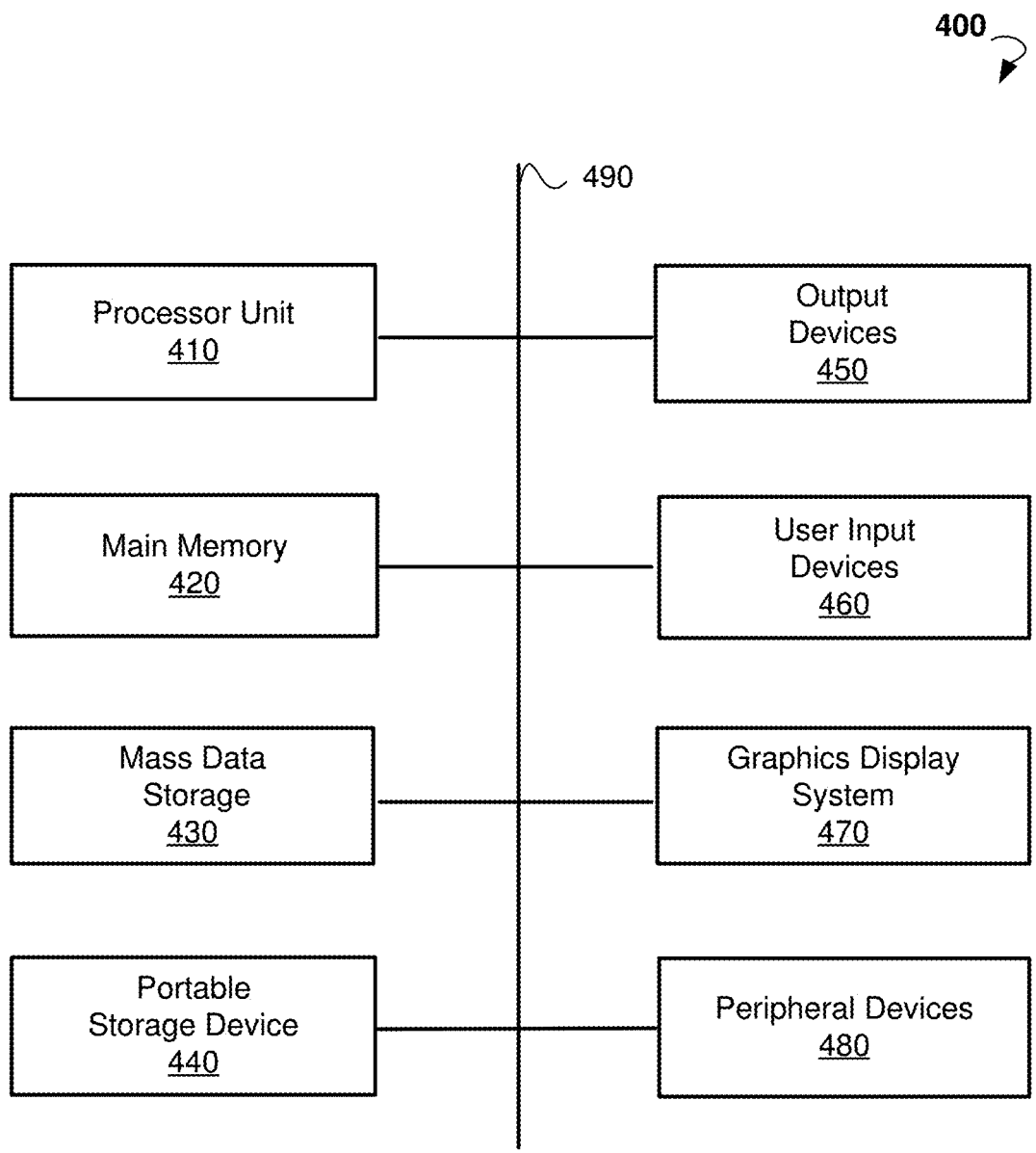
FIG. 4 is a computer system that can be used to implement some embodiments of the present disclosure.

FIG. 4 illustrates an exemplary computer system 400 that may be used to implement some embodiments of the present disclosure. The computer system 400 of FIG. 4 may be implemented in the contexts of the likes of the client 105, the server(s) 110, and the data source 115. The computer system 400 of FIG. 4 includes one or more processor units 410 and main memory 420. Main memory 420 stores, in part, instructions and data for execution by processor units 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 as shown in FIG. 4 includes output devices 450. Suitable output devices 450 include speakers, printers, network interfaces, and monitors.

Graphics display system 470 include a liquid crystal display (LCD) or other suitable display device. Graphics display system 470 is configurable to receive textual and graphical information and processes the information for output to the display device.

Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 5:
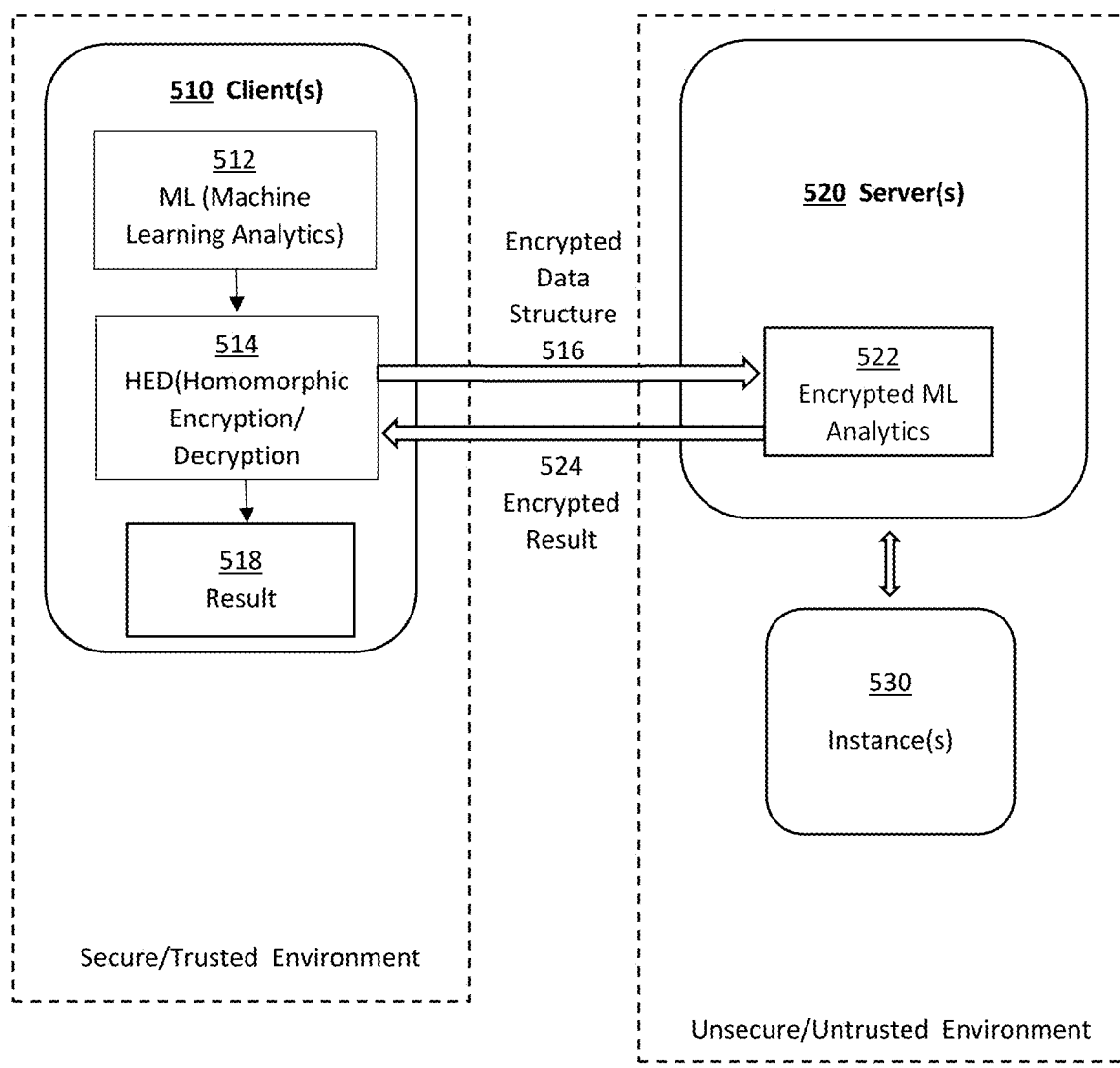
FIG. 5 is a block diagram of an example environment suitable for practicing methods for secure machine learning models using a homomorphic encryption as described herein.

FIG. 5 shows a block diagram of an example environment 500 suitable for practicing the ML methods described herein. It should be noted, however, that the environment 500 is just one example and is a simplified embodiment provided for illustrative purposes, and reasonable deviations of this embodiment are possible as will be evident for those skilled in the art.

As shown in FIG. 5, the environment 500 can include at least one client device 510 (also referred to as a client 510) and at least one server 520. As shown, the client(s) 510 can operate in a secure or trusted environment. The client(s) 510 can include any appropriate computing device having network functionalities allowing the device to communicate to server(s) 520. In some embodiments, the client(s) 510 can be connected to the server(s) 520 via one or more wired or wireless communications networks. In various embodiments, the client(s) 510 includes, but is not limited to, a computer (e.g., laptop computer, tablet computer, desktop computer), a server, cellular phone, smart phone, gaming console, multimedia system, smart television device, set-top box, infotainment system, in-vehicle computing device, informational kiosk, smart home computer, software application, computer operating system, modem, router, and so forth. While these various embodiments can include all these client devices, beneficially the client operates in a trusted environment and that the use of the client(s) 510 and the ML analytics or ML analytic data structures or parameters sent therefrom and results received are protected from unauthorized users.

The server(s) 520 can operate in an untrusted environment where an unencrypted machine analytic could be evaluated to learn information about computation being performed, intellectual property, proprietary information, sensitive information, or protected classes of information about ML analytic or the result of the ML analytic operation on instance(s) 530. For the purpose of this disclosure, an instance(s) 530 is input data used by a trained ML analytic to make a prediction, classification, or generate another result. The server(s) 520 receives homomorphically encrypted data structures 516 associated with a trained ML analytic, and executed in the homomorphically encrypted scheme. Thus, information about the ML analytic is obfuscated from parties in the untrusted environment.

In some embodiments, the server(s) 520 may be configured to store or provide access to at least one instance(s) 530. In certain embodiments, the server(s) 520 may include a standalone computing device. In various embodiments, the instance(s) 530 may be located on a single server(s) 520 or distributed over multiple server(s) 520. The instance(s) 530 may include plaintext data.

In some embodiments, the server(s) 520 may be implemented as cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In various embodiments, the client(s) 510 can make certain client inquires within the environment 500. For example, the client(s) 510 may be configured to send ML analytics to the server(s) 520 to be performed over the instance(s) 530. The server(s) 520 can be configured to perform the ML analytics over the instance (s) 530 and return the results of ML analytics to the client(s) 510.

To protect the content of the ML analytics, the client(s) 510 can include a ML analytics module(s) 512 that include at least one ML analytic model. These models can include but are not limited to neural networks models, decision tree models, or regression analysis models. These ML analytics models can be represented as machine executable code or using other representations including higher level languages.

The ML analytics contain at least one ML analytic data structure. These include data structures such as vectors of weights for a neural network analytic or a data structure representing a tree of features and splits for a decision tree analytic. The weight vector $W_n$ represents the trained weights for the neural network. More details regarding the neural network is provided below. For the ML decision tree, the associated data structure is the pre-specified tree of features and splits.

The trained weights $W_n$ of the neural network or data structure for the decision tree vector is passed to the HED (Homomorphic Encryption/Decryption) module 514. This module encrypts the ML analytic data structure using a homomorphic encryption scheme. In one embodiment, a fully homomorphic encryption scheme is used including but not limited to BFV (Brakerski/Fan-Vercauteren) and CKKS (Cheon-Kim-Kim-Song). Details of the homomorphic encryption of a trained neural network and decision tree data structures are described in more detail below.

The HED module 514 receives at least one data structure from the ML analytics module 512. The HED module 514 can also receive the ML analytic for transmission to the server(s) 520 or alternatively the servers(s) 520 can be preloaded with the ML analytic but lacking the trained data structures. The HED module 514 homomorphically encrypts the ML analytic data structure 516 which is transmitted to the server(s) 520.

The HED model 514 is configured to receive the homomorphically encrypted result 524, decrypt the result 524 using the homomorphic scheme, and output a result 518.

To protect previously mentioned aspects of a ML analytic, the server(s) 520 can be configured to perform the ML analytics using the ML homomorphically encrypted data structures in a homomorphic scheme on the instances 530 and thereby, obtain encrypted result of the encrypted ML analytics 522. The encrypted result 524 can be sent to the client(s) 510. The HED 514 can decrypt the ML encrypted result generating an unencrypted result 518.

Homomorphically Encrypted Neural Network Analytics

Figure 6A:
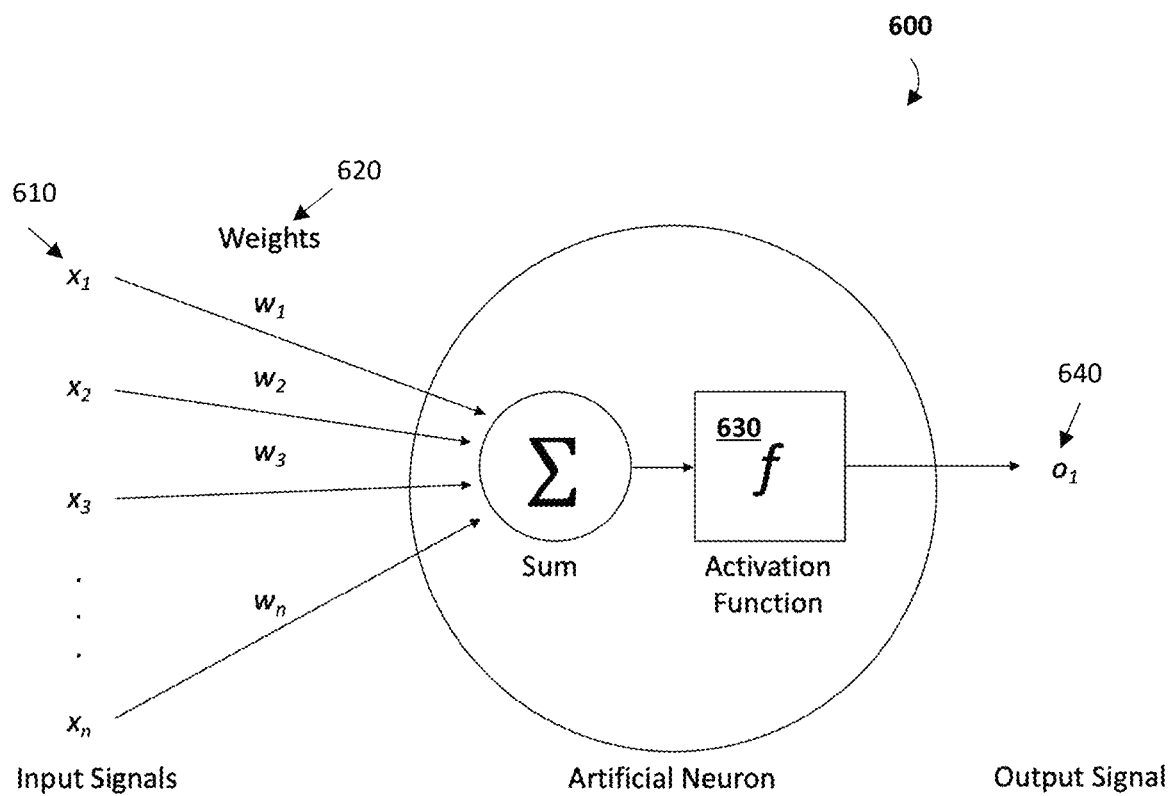
FIG. 6a is a diagram of an artificial neuron.

FIG. 6*a* shows a neuron 600 that may be used in a neural network analytic. A neural network is a type of machine learning model that is loosely modeled on the behavior of neurons and synapses in the brain. A neural network consists of a number of artificial neurons 600, arranged into a series of "layers." Each artificial neuron can have input 610 and output connections 640, along which they receive and transmit "signals," which are real number values. Each artificial neuron also has an "activation function," 630 which is a mathematical function that determines what the neuron's output signals will be given its input signals. Output $O_1$ 640 is one output of a single layer system. Each connection is also assigned a "weight," 620 which is multiplied with the signal 610 to determine the inputs to the activation function 630. The weight 620 is a measure of the importance of the signal in determining the neuron's output 640.

To make a result based on an instance, real values extracted from the instance are fed into the neural network as inputs 610 along designated input connections to the first layer of artificial neurons. These inputs 610 are multiplied with the connection weights 620 and fed into the activation functions 630 of the artificial neuron(s) 600, producing the output signals for that layer. The next layer (not shown) of artificial neurons uses these output signals as its input signals, and data is fed through the network this way until it moves through all of the layers and reaches designated output signals. Finally, these output 640 signals are interpreted as a prediction, classification or other result.

Figure 6B:
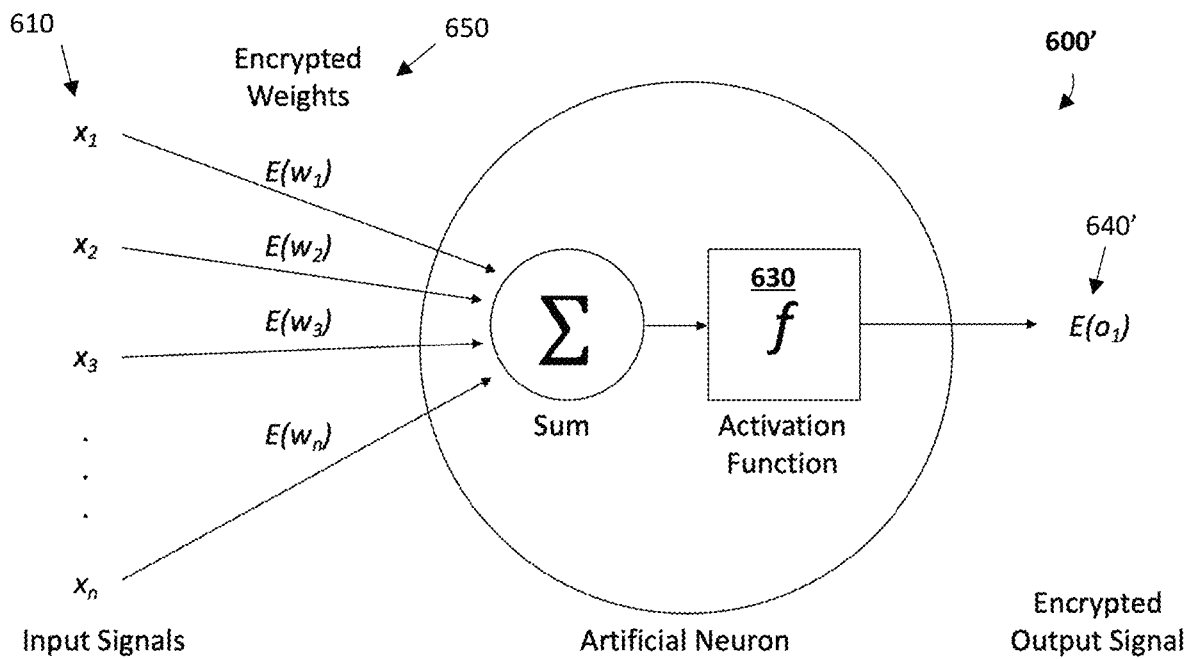
FIG. 6b is a diagram of an artificial neuron with encrypted weights.
Figure 7:
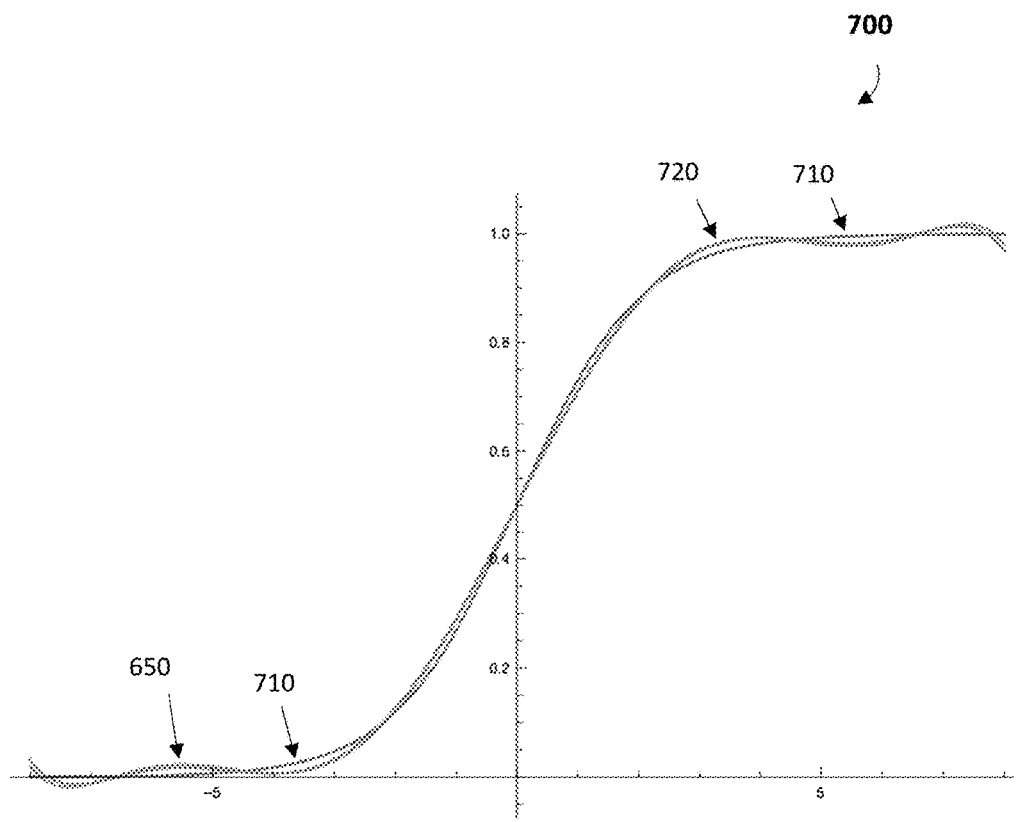
FIG. 7 is a graph of an activation function.

FIG. 6*b* shows a neuron 600' that can be in a secure neural network analytic. Security is provided by encrypting the neural network weights $W_n$ 620 using a fully homomorphic encryption scheme, such as BFV or CKKS thereby generating $E(W_n)$ 650. The homomorphic scheme used must support addition and multiplication operations using encrypted values. The encrypted weights $W_n$ 650 are then multiplied with the unencrypted real values extracted from the instance $X_n$ 610, producing encrypted values that are summed and fed into the activation function(s) 630 of the first layer of artificial neurons. If the activation function 630 is a polynomial function, it can be computed directly on the encrypted values; otherwise, it is replaced with a polynomial approximation function chosen in advance (see FIG. 7). The encrypted values output by the activation functions then move through the rest of the neural network in this way until they reach the designated output 640' signals, producing an encrypted prediction, classification or other result.

Encrypted Decision Tree

Figure 8A:
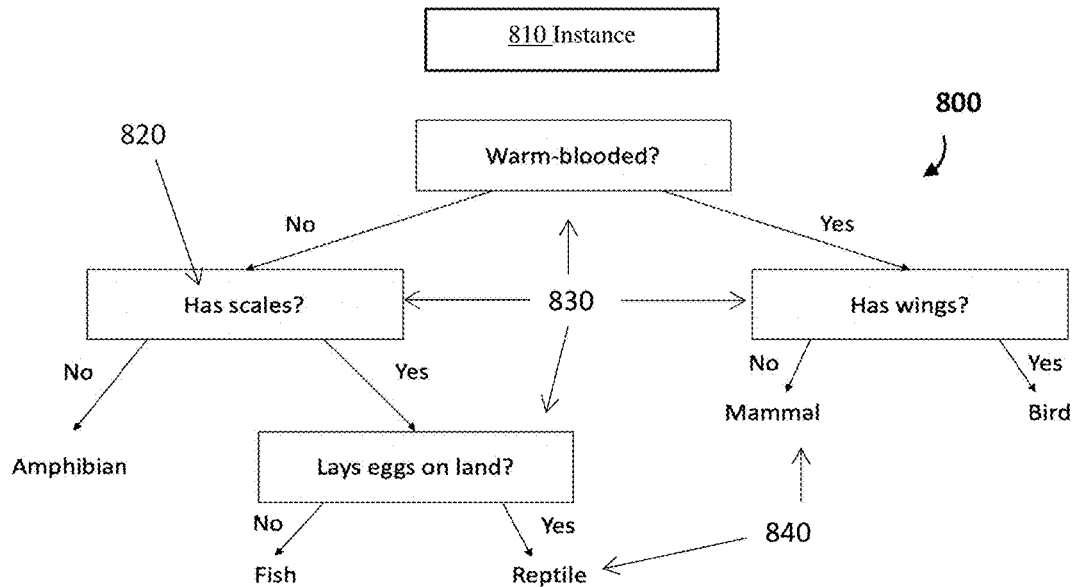
FIG. 8a is a decision tree with yes/no nodes.

FIG. 8*a* shows one block diagram of decision tree analytic 800. A decision tree analytic 800 is a type of machine learning model that represents a series of predetermined questions 820 that are asked about an instance 810 in order to choose a result 840 from a predetermined list. The result can be a prediction, a classification, or other result. A decision tree 800 is represented as a tree (as defined in graph theory) where each internal node 830 corresponds to a question about the instance 810. The only possible answers to a question must be "yes" or "no," and each internal node 830 has exactly two children: the left child corresponds to the "no" value and the right child corresponds to the "yes" value. The leaf nodes contain the possible results 840 that the decision tree analytic model can generate. The decision tree 800 with the corresponding questions, answers, nodes, and leaves, can be represented as a ML decision tree data structure 900—FIG. 9.

To evaluate an instance to generate a result, the algorithm starts at the tree's root node and computes the answer to its question; it follows the right branch if the answer is "yes" and the left branch if the answer is "no." The algorithm continues this way until it reaches a leaf node, and returns the result 840 assigned to it. FIG. 8*a* shows a simple decision tree for generating an animal's vertebrate group based on the instance's binary attributes.

Figure 8B:
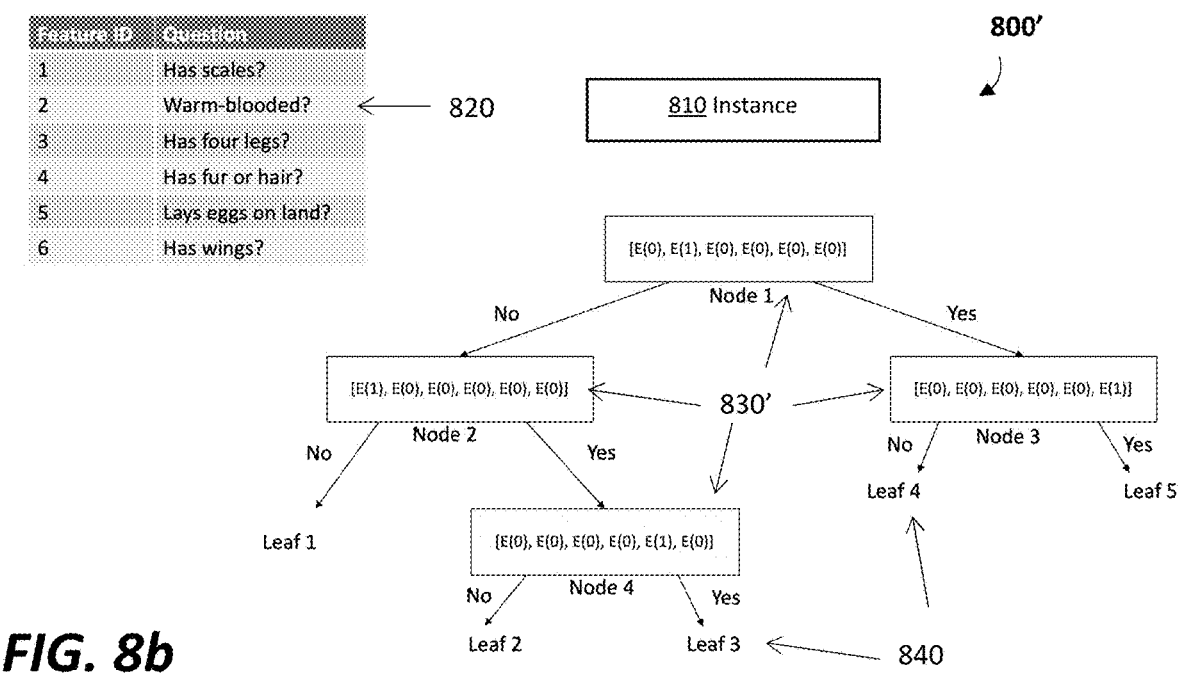
FIG. 8b is an encrypted decision tree.

FIG. 8*b* shows a diagram of the decision tree 800' by representing each instance as a collection of binary features (i.e. the possible values are 0 or 1). Each question in the decision tree is then represented as a "feature vector" of 0 or 1 values encrypted with a homomorphic encryption algorithm that supports addition and multiplication of encrypted values, such as BFV or CKKS. Each encrypted feature vector contains a single 1 value in the slot corresponding to the feature used to decide the question for that node; the other slots all contain 0 values. The results assigned to each leaf node are replaced with numerical identifiers, starting at 1 for the left-most leaf.

FIG. 9 shows the steps for calculating an encrypted decision tree result. The example instance 910 is a bovine animal. Since a bovine animal does not have scales, a "0" is assigned. A bovine animal is warm blooded so a "1" is assigned. The instance vector for a bovine animal is "011100" for the shown questions 905. To make an encrypted result of an instance 910, the binary feature values for that instance 915 are multiplied with the encrypted feature vectors 920 for each internal node. The sum of the multiplied values is then computed, and this is called the "encrypted node value" 930. This value is an encrypted 1 for all nodes where the answer to their question is "yes" for the current instance, and an encrypted 0 for all nodes whose answer is "no." Then, for each leaf node, the path from the root to the leaf is calculated. The process starts with the identifier for that leaf and, for each node on the path where the right branch is followed, multiplies the leaf identifier by that node's encrypted node value. Next, for each node on the path where the left branch is followed, the invention multiplies by one minus the encrypted node value 940.

For the leaf that would have been reached in the normal decision tree evaluation process for this instance, all of the multiplied values will be encryptions of 1 and the result of this multiplication will therefore be equal to an encryption of the leaf identifier; for any other leaf, at least one of the multiplied value will be an encryption of 0 so the result will be an encryption of 0. Finally, the computed values for all leaves are added up, yielding an encryption of the leaf identifier that is reached for this instance, which is the encrypted result 950. When this encrypted leaf identifier is passed back and decrypted by the model owner, the identifier is replaced by the true result value for the corresponding leaf node.

This technique encrypts the features used in the questions at each node in the tree but does not hide the structure of the tree. An extended embodiment of this invention masks the structure of the tree as follows. Assume some maximum tree depth D, such that no decision tree will have a depth (i.e. maximum number of nodes on any path from the root to a leaf) that exceeds D. Given a tree to encrypt, for any leaf nodes that are not yet at depth D, replace them by a decision node whose question is the same as the leaf's parent and whose children are both leaf nodes with the value of the original leaf. Repeat this process as necessary until all leaf nodes are at depth D and the tree is a full and complete tree. Then encrypt the resulting tree as described above.

Many types of instances contain numerical features which cannot be converted into binary features as described above. An extended embodiment of this invention handles such features using a homomorphic encryption scheme that supports evaluating binary circuits against encrypted values, such as GSW [3]. For each node in the decision tree that asks a question involving a numerical feature, the invention constructs an encrypted circuit that takes the instance data as input and produces an encrypted 1 (in a format compatible with the other encryption scheme) if the answer to the question is "yes" and an encrypted 0 if the answer is "no." For the rest of the processing of the instance, the invention treats this value as an additional feature as described above; the node that asked this question corresponding to the circuit will have this new feature's slot marked as a 1 in its encrypted feature vector.

FIG. 10 is a flow chart of an example method 1000 for performing secure analytics using a homomorphic encryption, according to some example embodiments. The method 1000 may be performed within environment 500 illustrated in FIG. 5. Notably, the steps recited below may be implemented in an order different than described and shown in the FIG. 10. Moreover, the method 1000 may have additional steps not shown herein, but which can be evident to those skilled in the art from the present disclosure. The method 300 may also have fewer steps than outlined below and shown in FIG. 10.

The method 1000 may commence in block 1005 with receiving, by at least one server, from a client, at least one learning machine analytic data structure. The at least one machine learning model data structure can be encrypted using the homomorphic encryption scheme. The homomorphic encryption scheme can include but not limited to BFV and CKKS schemes.

In block 1010, the method 1000 may proceed with extracting, by the at least one server, an instance.

In block 1015, the method 1000 may evaluate, by the at least one server, the at least one machine learning model data structure utilizing a trained machine learning model to obtain at least one encrypted result.

In block 1020, the method may proceed with sending, by the at least one server, the at least one encrypted result to the client. The client can be configured to decrypt the at least one encrypted result using the homomorphic encryption scheme.

The present technology is described above with reference to example embodiments. Therefore, other variations upon the example embodiments are intended to be covered by the present disclosure.

What is claimed is:

1. A method for performing a secure machine learning analysis using homomorphic encryption, the method comprising:
    receiving, from a client, by at least one server in an environment, an encrypted machine learning data structure formed by using a homomorphic encryption scheme to encrypt a machine learning data structure that has been generated by training a decision tree machine learning model that contains the machine learning data structure, the training performed in a trusted environment,
    the machine learning data structure including at least one feature vector having a feature depth that is greater than a decision depth of the decision tree machine learning model,
    the machine learning data structure based on the trained decision tree machine learning model;
    extracting, by the at least one server, a previously unseen instance of data;
    evaluating, by the at least one server, the encrypted machine learning data structure over the previously unseen instance of data using the decision tree machine learning model containing the encrypted machine learning data structure to generate at least one encrypted result about the previously unseen instance of data; and
    sending, from the at least one server, the at least one encrypted result to the client, the at least one encrypted result configured to be decrypted at the client using the homomorphic encryption scheme.

2. The method of claim 1, wherein the homomorphic encryption scheme includes a fully homomorphic encryption scheme.

3. The method of claim 2, wherein the fully homomorphic encryption scheme includes at least one of a Brakerski/Fan-Vercauteren and a Cheon-Kim-Kim-Song cryptosystem.

4. The method of claim 1, wherein the trained decision tree machine learning model is a regression model.

5. The method of claim 1, wherein the at least one feature vector consists of binary values.

6. A system for performing a secure machine learning analysis in an environment using homomorphic encryption, the system comprising:
    at least one processor in an environment; and
    a memory communicatively coupled with the at least one processor, the memory storing instructions, which when executed by the at least processor perform a method comprising:
    receiving, from a client, by at least one server in the environment, an encrypted machine learning data structure formed by using a homomorphic encryption scheme to encrypt a machine learning data structure that has been generated by training a decision tree machine learning model that contains the machine learning data structure, the training performed in a trusted environment,
    the machine learning data structure including at least one feature vector having a feature depth that is greater than a decision depth of the decision tree machine learning model,
    the machine learning data structure based on the trained decision tree machine learning model;

extracting, by the at least one server, a previously unseen instance of data;

evaluating, by the at least one server, the encrypted machine learning data structure over the previously unseen instance of data using the decision tree machine learning model containing the encrypted machine learning data structure to generate at least one encrypted result about the previously unseen instance of data; and sending, from the at least one server, the at least one encrypted result to the client, the at least one encrypted result configured to be decrypted at the client using the homomorphic encryption scheme.

7. The system of claim 6, wherein the homomorphic encryption scheme includes a fully homomorphic encryption scheme.

8. The system of claim 7, wherein the homomorphic encryption scheme includes at least one of a Brakerski/Fan-Vercauteren and a Cheon-Kim-Kim-Song cryptosystem.

9. The system of claim 6, wherein the at least one feature vector consists of binary values.

10. The system of claim 6, wherein the trained decision tree machine learning model is a regression model.

11. A non-transitory computer-readable storage medium having embodied thereon instructions, which when executed by at least one processor, perform steps of a method, the method comprising:

receiving, from a client, by at least one server in an environment, an encrypted machine learning data structure formed by using a homomorphic encryption scheme to encrypt a machine learning data structure that has been generated by training a machine learning model that contains the machine learning data structure, the training performed in a trusted environment, the trained machine learning model being a decision tree that has a decision depth, the encrypted machine learning data structure including at least one feature vector having a feature depth that is greater than the decision depth of the trained machine learning model, the machine learning data structure based on the trained machine learning model;

extracting, by the at least one server, a previously unseen instance of data;

evaluating, by the at least one server, the encrypted machine learning data structure over the previously unseen instance of data using the machine learning model containing the encrypted machine learning data structure to generate at least one encrypted result about the previously unseen instance of data; and sending, from the at least one server, the at least one encrypted result to the client, the at least one encrypted result configured to be decrypted at the client using the homomorphic encryption scheme.

12. The non-transitory computer-readable storage medium of claim 11, wherein the homomorphic encryption scheme includes a fully homomorphic encryption scheme.

13. The non-transitory computer-readable storage medium of claim 12, wherein the fully homomorphic encryption scheme includes at least one of a Brakerski/Fan-Vercauteren and a Cheon-Kim-Kim-Song cryptosystem.

14. The non-transitory computer-readable storage medium of claim 11, wherein the at least one feature vector consists of binary values.

15. The non-transitory computer-readable storage medium of claim 11, wherein the trained machine learning model is a regression model.

16. A method for performing a secure machine learning analysis using homomorphic encryption, the method comprising:

receiving, from a client, by at least one server in an environment, an encrypted machine learning data structure formed by using a homomorphic encryption scheme to encrypt a machine learning data structure that has been generated by training a neural network machine learning model that contains the machine learning data structure, the training performed in a trusted environment, the neural network machine learning model including a feature vector having a decision depth and a feature vector having a feature depth that is greater than the decision depth, the machine learning data structure based on the trained neural network machine learning model;

extracting, by the at least one server, a previously unseen instance of data;

evaluating, by the at least one server, the encrypted at least one machine learning data structure over the previously unseen instance of data using the neural network machine learning model containing the encrypted machine learning data structure of the neural network machine learning model to generate at least one encrypted result about the previously unseen instance of data; and sending, from the at least one server, the at least one encrypted result to the client, the at least one encrypted result configured to be decrypted at the client using the homomorphic encryption scheme.

17. The method of claim 16, wherein the homomorphic encryption scheme includes a fully homomorphic encryption scheme.

18. The method of claim 17, wherein the homomorphic encryption scheme includes at least one of a Brakerski/Fan-Vercauteren and a Cheon-Kim-Kim-Song cryptosystem.

19. The method of claim 16, wherein the feature vector consists of binary values.

20. The method of claim 16, wherein the trained neural network machine learning model is a regression model.

* * * * *

UNITED STATES PATENT AND TRADEMARK OFFICE
CERTIFICATE OF CORRECTION

PATENT NO. : 11,902,413 B2
APPLICATION NO. : 17/473778
DATED : February 13, 2024
INVENTOR(S) : Ellison Anne Williams et al.

It is certified that error appears in the above-identified patent and that said Letters Patent is hereby corrected as shown below:

In the Claims

In Column 14, Lines 27-28, regarding Claim 1, the phrase "decision treemachine learning model" should read "decision tree machine learning model".

In Column 16, Lines 32-33, regarding Claim 16, the phrase "the encrypted at least one machine learning data structure" should read "the encrypted machine learning data structure".

Signed and Sealed this
Twenty-sixth Day of March, 2024

Katherine Kelly Vidal
*Director of the United States Patent and Trademark Office*